United States Patent [19]

Sair et al.

[11] 4,232,047
[45] Nov. 4, 1980

[54] FOOD SUPPLEMENT CONCENTRATE IN A DENSE GLASSEOUS EXTRUDATE

[75] Inventors: Louis Sair, Evergreen Park; Ralph A. Sair, Lincolnwood, both of Ill.

[73] Assignee: Griffith Laboratories U.S.A., Inc., Alsip, Ill.

[21] Appl. No.: 910,274

[22] Filed: May 30, 1978

Related U.S. Application Data

[63] Continuation-in-part of Ser. No. 719,740, Sep. 2, 1976, abandoned, and Ser. No. 779,476, Mar. 21, 1977, abandoned.

[51] Int. Cl.³ .......................... A23L 1/22; A23L 1/30
[52] U.S. Cl. ...................................... 426/96; 426/104; 426/651; 426/656; 426/658; 426/661; 426/516; 426/638
[58] Field of Search ..................... 426/93, 94, 96, 97, 426/98, 549, 550, 618, 638, 650, 651, 104, 656, 658, 661, 516

[56] References Cited

U.S. PATENT DOCUMENTS 3,922,354  11/1975  Galluzzi et al. ......................... 426/96
3,962,416  6/1976  Katzen .............................. 426/96 X
3,968,268  7/1976  Sair et al. ............................ 426/580

FOREIGN PATENT DOCUMENTS 914997  11/1972  Canada.

OTHER PUBLICATIONS

The Merck Index of Chemicals and Drugs, Merck & Co., Inc., Rahway, N.J., 1960, pp. 976-977.

*Primary Examiner*—Robert A. Yoncoskie
*Attorney, Agent, or Firm*—Kegan, Kegan & Berkman

[57] ABSTRACT

A food supplement concentrate of an ingestible agent such as a seasoning, flavoring, oleoresin, essential oil, vitamin, mineral, and mixtures thereof encapsulated, enveloped or otherwise encased as a dispersed microphase within but recoverable from a matrix of encapsulating medium such as a starch, protein, flour, modified starch, gum, and mixtures thereof. The concentrate is prepared by mixing the edible agent and the encapsulating medium with a limited quantity of water adequate to permit conversion of the mixture, under applied extrusion pressure and controlled heat, to provide a dense, essentially unexpanded glassy extrudate with said ingestible agent dispersed therethrough in microform.

5 Claims, No Drawings

FOOD SUPPLEMENT CONCENTRATE IN A DENSE GLASSEOUS EXTRUDATE

This application is a continuation-in-part of Sair and Sair application Ser. No. 719,740 for "ENCASEMENT OF FLAVORING AND NUTRIENT AGENTS IN CARBOHYDRATE MATERIALS", filed Sept. 2, 1976, now abandoned, and Sair and Sair application Ser. No. 779,476 for "ENCASEMENT OF EDIBLE AGENTS IN AN EXTRUSION PROCESS" filed Mar. 21, 1977, now abandoned, and the entire disclosure of each of these applications is hereby incorporated herein by reference to the extent not inconsistent herewith.

BACKGROUND OF THE INVENTION

Encapsulation, an old art, is playing an ever increasing role in the food and in related industries. Many patents and other publications deal with the encapsulation of ingredients used in foods. In modern food processing it is essential that products have long shelf life and have excellent stability. Encapsulation plays a major role in satisfying these requirements.

For example, encapsulation makes it possible to stabilize and to protect essential oils from deterioration and loss during storage. Encapsulation may protect the potency and greatly increase the shelf life of oxidation-sensitive materials such as Vitamin A. Another important application relates to the stabilization of metallic compounds such as ferrous sulfate as well as copper salts and other minerals which may act as pro-oxidants.

The major encapsulation process in use today involves dissolving a gum or a modified starch in water, adding, for example, an essential oil with suitable agitation to produce an emulsion, and spray drying. In other procedures a solution of a protein such as gelatin serves as an emulsifying agent. A gel is formed and this is carefully dried and ground. Other techniques use sugar melts as protective encoating agents. Many applications use starches or flours. These are gelatinized followed by emulsification and spray drying. Fats have also been used as protective coatings.

Applicants' present invention constitutes a new approach to encapsulation. The method of the invention, using an extrusion step, is extremely simple and has many advantages over prior art processes.

In the last decade hundreds of patents have issued which deal with the structuring of vegetable proteins. The efforts in this area have been extensive. Extrusion has been a favorite technique for making many food products such as breakfast foods, snacks and breadings.

In such prior art extrusion processes, the products produced are friable and essentially ready to eat. All are expanded or "puffed", similar to a product such as puffed rice. In more recent years textured vegetable protein products have been developed. In Atkinson, U.S. Pat. No. 3,488,770, soy flour, moistened with about 30% by weight of water, is passed through an extruder in which heat and applied pressure convert the moist mass to a molten state or melt. This material is then exploded into the atmosphere to produce what is known as textured vegetable protein (TVP). The product is porous and friable, and is intended to simulate or replace meat.

In searching for new forms of vegetable protein which could be used for the food supply, Sair & Quass U.S. Pat. No. 3,968,268 devised an extrusion process for forming a dense transluscent, glassy protein. This product was quite different from the products produced by Atkinson, and different from the extruded breakfast cereals, snacks, and breadings. The glassy protein was hard and vitreous and not edible in this form. Additional cooking or hydration was needed as in the case of rice, wheat or other grains. The protein glass of Sair & Quass was produced by applying heat and pressure to a moist protein mass and extruding under conditions which prevent puffing.

In prior art encapsulation processes, as commercially practiced, the ratio of water to encapsulating agent has been, for example, 2 to 1, to 5 to 1. Sufficient water is added to produce a solution, followed by suitable emulsification. In reviewing the technology used in developing simulated meat products such as textured vegetable protein the inventors herein queried whether there might not be a completely new encapsulation procedure constituting a major advance over the prior art. Specifically, if one could utilize the extrusion process to produce a molten, unpuffed glass or melt of a polymeric material to effect encapsulation, the development would have the following advantages:

1. Extrusion is a continuous process, and it is simple.
2. During extrusion one could use minimal water, whereby drying conditions would be greatly simplified. Spray driers could be eliminated.
3. The finished product could be shaped to any desired form. One would not be limited to fine (spray-dried) particles.
4. Extrusion would result in a microencapsulation within a matrix of controlled solubility. Release of the encapsulated agent would be gradual, dependent on hydration of the matrix.

Still other advantages become evident.

Glass formation is not unique to proteins. Mercier and Feillet in *Cereal Chemistry*, Vol. 52, page 283 (1975) describe glasses formed from cereal-like materials.

It was known that certain polymer films such as polyethylene may serve to protect hygroscopic materials but afford very little protection for the essential oils of flavorings. It was also known that other polymer films such as cellophane are suitable to protect essential oils. The essence of the present invention is the surprising discovery that protein and cereal polymer matrices behave like cellophane, providing excellent protection of encased agents, including essential oils, in an encapsulation process. It was also found that, upon hydration of the polymer matrix, the encased agent was gradually released in a highly effective form.

In the conventional prior art extrusion procedures being used to produce cereals, snacks, breadings and textured vegetable proteins, it is known that if a flavoring is added to the material prior to extrusion much of the flavoring agent is lost during the puffing expansion. Accordingly, the accepted method has been to add the flavor oil or other flavoring agent only after extrusion. An example is a product sold under the name BACOS. The product consists of small chunks of vegetable protein made by the process described for producing textured vegetable protein. The small porous chunks of material are then treated with vegetable oil to which the selected flavor agent has been added. The snack industry has continued its search for flavoring materials that can be added prior to the extrusion step, but with no success. The extruded polymer glasses of the present invention, in which expansion or puffing is deliberately prevented, provide a novel and unobvious encapsulating medium to produce valuable concentrates of flavors and other agents.

Typical of prior art methods is that described in Katzen U.S. Pat. No. 3,786,123 which teaches an extrusion process for stabilizing and preserving nutrients and other ingestible agents. But the Katzen process is totally unsuited to produce the flavor concentrates of the present invention, because Katzen resorts to explosion puffing, to form a porous product. In controlled tests, it has been found that when 4% of oil of sage is incorporated in a mixture and then extruded following the Katzen teachings, half of the essential oil is lost. In contrast, the process of the present invention, produces an unpuffed, vitreous glass, over 90% of the essential oil being retained in the final product. Katzen teaches only an expanded, porous product. He suggests no dense glasseous extrudate. The Katzen process, for producing a porous product, cannot be used to encapsulate an agent having volatile constituents.

In accordance with the practice of the present invention it has been found that for some applications one type of extrudate glass is superior to another as the matrix. For example, it has been found that certain flavor oils such as mustard flavor oil (containing allylisothiocyanate) undergo objectionable reactions with functional groups of proteinaceous materials to yield final products which do not have the odor and flavor of mustard. On the other hand when a cereal base material is used as the glasseous matrix for the allylisothiocyanate, the final concentrate has true mustard flavor. In the encapsulation of lemon flavor for use with tea, it has been found that the citric acid in the lemon flavor agent reacts with alkaline functional groups of a proteinaceous glass so that the citric acid is not released when the flavor concentrate is added to hot water. In contrast, when a cereal glass encapsulating matrix is used, no functional groups interfere, and the citric acid is immediately released to the tea along with the other lemon flavor elements.

Still other considerations may dictate the selection of special encapsulating agents in particular applications of the present invention. When more rapid solubilization and release are required, a cereal glass is used in preference to protein. When still more rapid solubilization is desired, a gum glass or a modified starch glass may be used as the extrudate matrix.

In the encapsulation of iron for incorporation in cereal products, the aim of industry has been to add the iron prior to extruding. Several approaches to dealing with the problem have been unsuccessful. For example, when hard fats are used to encase minerals such as iron, the high cereal processing temperatures cause the fat to melt and to liberate the mineral prematurely. Some proteinaceous encapsulating materials dissolve during the processing and release the minerals. In accordance with the practice of the present invention, the use of wheat gluten as an encapsulating material effectively solves the problem. Wheat gluten is quite insoluble in water. When iron is encapsulated in a water-insoluble wheat gluten glass, in combination with an additional water-proofing agent such as zinc stearate, in accordance with the present invention, the ground product withstands processing intact, the iron being retained within the fused, water-insoluble protein matrix.

Depending upon the agent to be encased, concentrations of up to about 40% or more may be effectively encapsulated in the polymeric matrix. The food supplement concentrations of the invention may be added to food products in concentration of up to about 15%, or higher.

SUMMARY OF THE INVENTION

The present invention is based upon the discovery that it is possible effectively to encase or encapsulate an essential oil or other edible agent as a dispersed microphase in a polymer matrix derived from starch, flour, gum, cereals, or protein, by mixing the encapsulating material and the agent to be encased with a minimal quantity of water and, through application of heat and pressure in extrusion, to form a dense, glass-like extrudate melt in which the encased agent is uniformly distributed in micro-form as a protected dispersed phase to provide a food supplement concentrate of the encased agent. The release of the encased agent is ultimately effected through hydration or through digestion of the enveloping matrix.

The concentrate of the present invention is substantively different from the products of Sair et al U.S. Pat. No. 3,968,268, which is directed to an extrudate intended to be and which is an ultimate food product. The products of the subject invention are not foods, per se, but are flavor and nutritional food supplement concentrates for incorporation into food products. Whereas the retention of structural integrity, even under retorting conditions, was the principal goal and an important feature of the products of U.S. Pat. No. 3,968,268, there is no such requirement for the encapsulated concentrates of the present invention.

The method of the present invention has been found particularly useful in the encasement of essential oils or artificial flavors. Flavorings for the food industry may be either natural spices or soluble seasonings, or essential oils. For many applications, the essential oil or oleoresin derived from the spice is preferred to the natural spice. One prior art technique is to deposit the essential oil or the oleoresin on a carrier such as salt or sugar. The inherent marked volatility of the essential oils in the soluble seasonings has prompted research directed to preventing the escape or loss of the "active" ingredients.

It is an important feature of the present invention that there are provided methods and products whereby the essential oils or oleoresins of natural spices are encased in dense, polymeric glasseous melts (about 55 to about 90 pounds per cubic feet) of polymeric materials derived from natural sources to provide a stable microdispersion in a protective enveloping matrix.

It is a related feature of the invention that the solid extruded glass-like material containing the microdispersion of essential oil (or other agent) may be ground to provide a particulate product in which the encased component is time and atmosphere protected and maintained in a stable condition.

The enzyme systems of many natural flavor agents are subject to premature chemical breakdown with resulting destruction of the flavoring components. Moreover, certain of the prior art encapsulating or encasing agents undergo reactions with the active agent of the flavor, again destroying the latter. Typical of susceptible flavoring agents is natural mustard in which flavor is derived largely from allylisothiocyanate. When oil of mustard is encapsulated in a protein or protein-derived system, chemical groups on the protein molecule react with the allylisothiocyanate to convert the flavor to something quite different from what is desired. In contrast, it has been discovered that encasement of the oil of mustard in a carbohydrate-derived glasseous polymeric extrudate matrix does not cause such objectionable changes in the flavoring. The final, ground product exhibits excellent stability and unexpectedly long shelf life.

The glass-like, unexpanded extrudate produced in accordance with the present invention has also been found to be an excellent matrix for the incorporation of a mixture of lemon flavoring and citric acid. The resulting product, reduced to the appropriate particle size and introduced into boiling water, effects an immediate release of the encased citric acid and the lemon flavor so as effectively to simulate the use of lemon itself.

In marked and important contrast to encapsulation by spray drying, in which the final products are very fine particles, the present invention produces extrudate materials which may be fashioned, physically, to simulate "natural" products. For example, using the process of the invention it is feasible to extrude a product in which the flavoring agent of black pepper is dispersed and encased, with appropriate coloring matter, so that the extruded, solid, glass-like ribbon can be ground or otherwise reduced to any desired particle size, for example, corresponding to a coarse black pepper or a fine black pepper. The final product will, thus, have not only the flavoring capabilities but also the overall visual appearance of the natural material.

The method of the invention also lends itself to the production of "simulated" natural vegetables. For example, it is possible to incorporate suitable coloring as well as green bell pepper flavoring in a carbohydrate material which is then extruded as a molten glass ribbon. This ribbon is then further processed through a roller mill to an ultimate thickness corresponding generally to that of natural green bell pepper. The sheet material is cut to shape to provide a product which may be used in food and food preparations in the same manner in which its natural counterpart is used.

An important property of certain products of the present invention is that the encasing or matrix material has a lesser solubility than do many encapsulation agents used heretofore. As a result, the essential oil or other active agent in the encasement system is released and distributed more slowly. That is, the present invention provides products which exhibit a slower extended, and more controlled flavor release.

When using starch-derived material as the encapsulating medium, the processing conditions of the invention are critical to obviate the transformation of the starch-like material into a sticky unwieldly mass. This undesirable result is avoided, in accordance with the practice of the invention, by carefully controlling and limiting the addition of water. Specifically, the water used is provided in a concentration which is insufficient to promote conventional gelatinization. The invention relies upon the combination of controlled pressure with limited moisture and further requires that the extruded glass-like product be discharged from the extruder head at a temperature below the boiling point of water, so as to obviate puffing or expansion. The method is unique and unobvious as an encapsulating technique. The extrudate is discharged as a dense opaque-to-translucent glass-like material in which the essential oils or other flavoring ingredients are dispersed in micron size and locked in the glass-like matrix. The product is new.

When a gum such as gum acacia is used, it has been found that it is not necessary to put the gum into solution. It has been found feasible to blend the gum with a limited quantity of water. The essential oil or other nutrients can then be added and the mixture introduced into the extruder to form a dense glass in which the nutrient is a microdispersion. Upon discharge from the extruder, the product is shaped and dried.

The term "ingestible material" as used herein is intended to encompass broadly any dispersible, soluble, or emulsifiable, or dispersible, edible material such as seasonings, flavor ingredients, essential oils, vitamins and minerals, nutrients, and components thereof or mixtures or blends of the above both solids and liquids, but particularly liquids. In all cases the agent is substantially uniformly distributed as a protected, stable, but recoverable dispersed microphase within a polymeric matrix derived from a natural material. Since the ultimate product is for the most part added to foods or food products at a level of 0.1 to about 2%, and ordinarily less than 15%, to impart flavor or special nutritional properties thereto, or for some similar purpose, the final products of the present invention are appropriately designated "concentrates".

The essence of the subject invention does not lie in the selection of any particular agent to be encased, or in any unique combination of such agents, or in the selection of any specific encapsulating material as a protective matrix. Rather, the invention comprises a dense, glass-like organic polymeric extrudate, for example, casein, flour, gluten, gelatin, gum, starch, modified starch, and cereal material in which a dispersed ingestible agent is retained as a stable, protected, microparticulate, which agent is releasable upon hydration or digestion of the enveloping matrix.

The novel encapsulation method of the invention has important advantages over prior art procedures. The process, which consists in mixing an ingestible agent such as an essential oil or flavoring with a moist polymeric material and then heating and forcing the mixture through an extruder to effect encapsulation of the ingestible agent as a microdispersed phase is elegantly simple and remarkably effective. Compared with spray-drying, the present invention effects important savings in energy requirements. The usual need, as in spray-drying, to vaporize three or more parts by weight of water to produce one part of final product is obviated. The ratio of water to encapsulation media, as practiced in the present invention (ordinarily less than 1:1), is markedly reduced as compared with the high dilution ratio required in spray-drying. Providing options as to particle size, the method of the invention is further distinguishable from and superior to spray drying.

Whereas in spray-dried products the resulting envelope is highly soluble in aqueous systems, an important feature of the invention is that some of the coating media have significantly limited water solubility and release the encased material over a relatively extended time period, correlated with the time required for hydration of the polymeric matrix. The encased agent is released in a controlled manner.

By utilizing the process of this invention it is possible to simulate the natural spices. If desired, suitable colorings can be added along with the proper level of essential oil and oleoresin and simply through extrusion followed by suitable sizing, products can be made which look remarkably like black pepper or sage or oregano or like any other spices. The products, of course, show excellent stability on storage whereas in the natural spices the essential oil may be lost unless special provisions are made for protection through packaging.

Whereas the natural spices may contain substantial levels of insect fragments and other normal contaminants found in spices, these contaminants are virtually absent in the product of this invention. Whereas normal spices may have extremely high bacterial counts and may require gas sterilization to reduce the count, this treatment is not necessary with the simulated products of the present invention.

This invention makes possible the manufacture of a completely new line of seasoning products. Normally, soluble seasonings are prepared on a salt or sugar base and the level of essential oil or oleoresin that can be added to salt or sugar is relatively low, rarely approximating more than 5%, because the products become too wet. By utilizing the process of the invention one can make products with 2,3, or even 10 times the strength of the soluble seasonings with the added advantages of complete stability, and free-flowing capability, together with protection of the flavorings during storage. Such concentrates, from an economy standpoint, have great advantages in reducing freight costs, warehouse storage space demands, etc. The effective, simple encapsulation procedure of the invention has many uses which render old seasoning practices obsolete.

In the usual encapsulation procedures the product is spray-dried and the finer, often more fragrant, volatile constituents are lost. By utilizing the glass extrusion encapsulation process of the invention one can grind the product in the "moist" state to the desired shape. Since there is relatively little moisture, the product may be dried at temperatures as low as 100° F. so that the fine flavor volatiles remain in the encapsulated product.

DETAILED DESCRIPTION OF PREFERRED EMBODIMENT

The products of the invention and the methods of producing the same are typified by the specific examples set forth below, provided for illustration only, and not in any limiting sense.

It is a critical feature of the products of the present invention that they are dense glasseous extrudates produced under conditions to obviate puffing or expansion. Although processing temperatures in the extruder may reach 300° F. or higher, the product as discharged, from the extruder to atmosphere, is at a temperature essentially below the boiling point of water. The necessary pre-cooling may be carried out in the extruder or in an auxiliary attached cooling conduit. Processing pressures may be in the range of about 500 to 3000 psi. In all cases, however, the exit pressure at the die orifice is essentially zero and the temperature is below that which would produce puffing. The density of the virtually unexpanded glasseous extrudate is in the range of from about 55 to about 90 pounds per cubic foot.

The aims and objects of the invention may be accomplished through the use of commercially available extrusion equipment. Accordingly, no detailed description of apparatus is provided herein. A Brabender Pilot Plant Extruder was used in some of the work reported below.

In initial experiments using the Brabender which culminated in the discovery which produced the novel products of the present invention, a series of materials including starches and flour were subjected to the combination of heat and pressure, in the presence of moisture, to determine the process parameters for forming extruded "glasses." Typical data are set forth in Tables I and II below.

TABLE I

EXTRUSION CONDITIONS EFFECTIVE TO FORM STARCH AND FLOUR GLASSES

| Carbohydrate | % Water in the Blend | Die Temperature (°F.) | % Moisture After Drying and Grinding |
|---|---|---|---|
| Corn Starch | 26.6 | 217 | 7.6 |
| Potato Starch | 34.9 | 203 | 7.2 |
| Waxy Maize Starch | 40.7 | 203 | 10.5 |
| Hard Wheat Flour | 25.1 | 220 | 9.2 |
| Yellow Corn Flour | 26.7 | 203 | 9.3 |

TABLE II

EXTRUSION OF STARCHES AND FLOURS TO FORM GLASSES

| Material | % Moisture in the Material | Die Temperature % | Pressure at the Die (psi) | Appearance of the Cooled Extrudate |
|---|---|---|---|---|
| Waxy Maize Starch | 18.2 | 203 | 4,000+ | Opaque to Glassy |
| | 26.9 | 203 | 1,500 | Opaque to Glassy |
| | 40.7 | 203 | 800 | Glassy |
| Potato Starch | 27.2 | 203 | 1,800 | Glassy |
| | 27.2 | 220 | 1,800 | Glassy |
| | 34.9 | 203 | 1,500 | Glassy |
| | 34.9 | 220 | 1,800 | Glassy |
| Corn Starch | 26.6 | 203 | 1,600 | Opaque |
| | 26.6 | 220 | 1,750 | Opaque to Glassy |
| | 35.6 | 203 | 1,450 | Glassy |
| | 35.6 | 220 | 1,350 | Glassy |
| Corn Flour | 17.5 | 203 | 4,000+ | Glassy |
| | 17.5 | 220 | 4,000+ | Glassy |
| | 26.7 | 203 | 3,000 | Glassy |
| | 26.7 | 220 | 2,400 | Glassy |
| Wheat Flour | 17.2 | 255 | 4,000+ | Opaque |
| | 17.2 | 284 | 4,000+ | Glassy |
| | 25.1 | 203 | 2,300 | Opaque |
| | 25.9 | 220 | 3,000 | Almost Glassy |

The data establish that for various starch and cereal products there are differences in the moisture concentration and in processing temperatures conducive to forming extruded glass-like products. For example, wheat flour exhibits a lesser tendency for glass formation. In general, it has been found that, within limits, increased moisture and the use of higher temperatures promote the formation of glasseous products. In all experimental runs recorded above, a 1:1 transfer screw was used in conjunction with a barrel temperature of 140° F. The extruder was fitted with a 7 inch die extension which was flattened at its exit orifice to a ⅛" by ⅝" slit. The extension was air cooled so that the extrudate was discharged in long, continuous, normally glass-like, unexpanded sheets or ribbons.

EXAMPLE 1

| Modified Potato Starch as an Encapsulating Composition for Oil of Sage | |
|---|---|
| Potato Starch* | 675 grams |
| Water | 225 ml. (25%) |
| Oil of Sage | 27 ml. (4%) |

*Product of Penick & Ford, sold under trademark "CROWN".

The modified starch was placed in a mixer, water added, and oil of sage blended in. The blend was then fed into a Brabender extruder using a 1:1 transfer screw at 100 rpm and a barrel temperature 140° F. The die temperature was 203° F. and the pressure at the die was 1,000 psi. A die extension 7" long and flattened to ⅛"×⅝" at the tip was attached at the exit port of the die and was air cooled so that the potato starch glass extruded a continuous unexpanded ribbon or strip. the glass strips were dried in an air oven for 1 hour at 200° F. and the dried material then ground using the Fitqpatrick mill fitted with a ⅛" screen. The finished product all passed through a 40 mesh screen.

TABLE III

| Length of Storage of the Carbohydrate Extrudate Containing Oil of Sage | % Essential Oil Content on Storage at 100° F. |
|---|---|
| 0 Days | 3.3 |
| 4 Days | 2.9 |
| 14 Days | 3.0 |

The essential oil transferred into the extrudate was in excess of 80%, and the product's stability was excellent, as shown in Table III. When used at a level of 4 ozs. per pound of meat, an excellent sage flavor was imparted.

Using the same extruder, with a 1:1 transfer screw at 100 rpm, a barrel temperature of 140° F., a die temperature ow 203° F., and pressure in the range of from 500 to 3000 psi at the die, other carbohydrate materials yielded comparable results, as shown in Table IV.

TABLE IV

| Carbohydrate | Moisture the Feed Blend (%) | Oil of Sage Added (%) | Conc. of Essential Oil in Dried Ground Extrudate | Conc. of Essential Oil After Storage at 100° F.(%) | |
|---|---|---|---|---|---|
| | | | | 4 Days | 14 Days |
| Waxy Maize | 37 | 4 | 3 | 2.3 | 2.1 |
| Waxy Maize | 39 | 6 | 4 | 4.3 | 3.9 |
| Potato Starch | 35 | 4 | 3.3 | 2.9 | 3.0 |
| Potato Starch | 35 | 6 | 3.9 | 3.7 | 3.9 |
| Yellow Corn Flour | 24 | 4 | 3.4 | 2.2 | 2.5 |
| Yellow Corn Flour | 28 | 6 | 4.2 | 3.9 | 4.2 |

The essential oil converted* approximated 70 to 80%. Stability was excellent.
*That is, 70-80% of the essential oil used was found in the final product.

Similar data for encapsulated oil of nutmeg are shown in Table V, for extruder settings and operation corresponding to conditions used for the oil of sage runs.

TABLE V

| Product | Moisture of the Feed Blend (%) | Oil of Nutmeg Added | Conc. of Oil in Dried Ground Extrudate (%) | Conc. of Essential Oil after Storage at 100° F.(%) | |
|---|---|---|---|---|---|
| | | | | 4 Days | 14 Days |
| Waxy Maize | 36 | 5 | 3.1 | 3.2 | 3.0 |
| Potato Starch | 35 | 5 | 2.5 | 2.4 | 2.7 |
| Yellow Corn Flour | 27 | 5 | 2.9 | 3.0 | 3.2 |

Oil, conversion approximated 60% and the stability in all cases was almost perfect.

It will be appreciated that the percent of oil transferred into the extruded product is affected by the particular equipment used, since there must be intimate mixing in the molten state in order to subdivide the essential oil to the micron state. In all cases stability studies were conducted on product which had been ground to pass a 40 mesh screen.

EXAMPLE 2

Combination of High Protein Flours with Starch

A blend was prepared using:

Soy Flour: 270 gms.
Potato Starch: 180 gms.
Water: 150 ml. (25%)
Oil of Sage: 18 ml. (4%)
The protein content of the dry blend was 30%

The blend was extruded using the pilot plant Brabender extruder which was run at 50 rpm using a 1:1 screw with an 8" cooling extension. The barrel temperature was 150° F. and the die temperature was 300° F. The extension was cooled with air at 2 psi. The unexpanded extrudate was glassy and the pressure at the die was 2,000 psi.

The glass extrudate was dried for 30 minutes at 210° F. and then ground in a Raymond mill to pass a 20 mesh screen. The essential oil content of the dried product was 3.05% on a dry basis indicating a 76% conversion, and the sample, when stored for 4 days at 100° F., showed 3.03% essential oil on a dry basis, and indicating excellent stability. After 14 days the oil content on a dry basis was 2.95%.

Three ounces of the concentrate when added to 100 pounds of meat gave an excellent sage flavor.

EXAMPLE 3

Encapsulation of Citric Acid and Lemon Oil for Iced Tea

It is practical, in accordance with the present invention, to compound an encapsulated lemon product which can simply be added to a tea bag to make a lemon iced tea. Since lemon juice, which is normally used in the home, has a very high citric acid content, one should preferably also include, in lemon juice substitute, an acidity factor as well as the lemon flavor factor.

A composition found to be excellent for the purpose described is the following:

| Potato Starch | 46 lbs. |
|---|---|
| Citric Acid | 47 lbs. |
| Spray Dired Lemon (20% oil)* | 7 lbs. |
| | 100 lbs. |
| Water added Based on Formula | 5 lbs. (5%) |
| Sethness B & C Carmel | 2.5 lbs. |
| BHA | 0.1 lbs. |

*Manufactured by MCP Foods, Inc., Anaheim, California. (There was no need to use a spray dried product except that the particular lemon flavor used was desirable. Direct encapsulation of lemon oil could have been carried out, according to the method of the invention)

The extrusion conditions using a laboratory Brabender extruder, Model 100, were as follows:
Screw: 1:1 (transfer)
RPM: 35
Barrel Temperature: 140° F.
Die Temperature: 185° F.
Extension: ⅜" I.D. ×7" long, last 6" flattened to ⅛"
Extension Cooling: 0–2 psi air The extrudate, a warm, shiny, ribbon, was cooled to provide a glassy strip. The strips were placed on a tray and dried at 200° F. for 30 minutes. Dry ice was added to the dried product prior to grinding to minimize any gumminess.

The fraction going through a 14 mesh screen and remaining on a 40 proved to be an excellent granule size for addition to tea bags. The moisture content of the dried product was 6.5% and the essential oil content was 1.4%. On storage for 14 days at 100° F., there was no discernible change in essential oil content, showing excellent stability. 78% of the citric acid in the composition dissolved in the boiling water. In making iced tea 0.53 gms. of the encapsulated product, of this example, was mixed with 2.25 gms. of tea normally used in a tea bag. The tea bag was submerged in 100 ml. boiling water, brewed for 5 minutes, and then removed. Ice was added to a final volume of 160-165 ml. In making tea at home one often adds lemon juice equivalent to ⅜ teaspoon and this imparts not only a lemon flavor but also the acidity characteristic of good lemon tea.

The citric acid which dissolved during preparation of iced tea gave an acidity comparable to that obtained when using lemon juice. Thus, in both flavor and acidity, the product of this example was found to be equal to the product obtained using lemon juice.

In developing the above product for flavoring tea with lemon and acidity, it was found that encapsulation of the lemon oil and citric acid in a starch base is preferable to encapsulation using a protein base. The difference is believed to be due to the tendency of the protein to bond the citric acid, probably chemically, resulting in a poor release of the citric acid when added to the boiling water.

EXAMPLE 4

Encapsulation of Mustard Oil in Starch

There has been a recognized need to separate the mustard oil flavoring from the natural mustard containing enzyme systems which tend to impair the stability of the mustard oil in storage.

Encapsulation of mustard oil in protein bases results in a flavoring change to provide something that resembles garlic rather than mustard. In contrast, it has been found, in accordance with the present invention, that encapsulation of mustard oil in starch or in a starch derivative or modified starch yields products which have true flavors with good stability.

The formulation used was as follows:
Mustard Oil: 5 lbs. (5%)
Waxy Maize Starch*: 95 lbs.
Water: 44 lbs. (32%)
*A starch phosphate ester cross-linked through phosphorous oxychloride. (Product of American Maize).

A Brabender extruder was operated at 100 rpm using a 1:1 transfer screw with a barrel temperature of 140° F. and a die temperature of 212° F. The cooling extension was 5" long flattened to ⅛. The pressure at the die was 500 psi and the glassy extrudate was dried for 40 minutes in an oven at 200° F. with circulating air and was then ground in a Raymond mill to pass a 40 mesh screen.

The ground product contained 10% moisture and 1.9% essential oil and showed excellent stability since the value remained unchanged after 4 days and even after 18 days of incubation at 100° F. The encapsulated mustard product, when tasted against a No. 2 mustard flour which has a high pungency, was found to be quite comparable in flavor.

It is quite difficult to work with mustard oil commercially because of its extremely disagreeable pungent odor. Converting it on an encapsulated cereal base produces a product which can be used with a minimum of difficulty, and the initial odor problems can be controlled in the commercial operation of encapsulation.

EXAMPLE 5

Cereal Encapsulation to Make Green Bell Peppers

Dehydrated vegetables are extremely costly and are utilized more as a garnish than as a flavor.

By utilizing the process of the invention, one can form products with controlled size, shape, and thickness, to simulate almost any natural vegetable product.

An example to simulate green bell peppers is as follows:
Artificial Green Bell Pepper Flavor: 0.8 lbs.
Wheat Flour (Eckhart No. 3): 86. lbs.
Cane Sugar: 11.2 lbs.
Salt: 0.8 lbs.
Monosodium Glutamate: 0.9 lbs.
Food Color*: 0.3 lbs.
Water: 17.0 lbs. (15%)
*Combination of four different Warner-Jenkinson F.D. & C. Color Lakes give a medium green color.

A blend of the above was extruded using a Brabender extruder at 100 RPM and using a 1:1 transfer screw. The barrel temperature was 140° F. and the die temperature was 185° F. The extension was 7" long flattened to ⅛ inch. The product came out in a long glassy strips requiring no additional cooling. The pressure at the die was 2,150 psi. The extruded ⅛" ribbons were flattened to 1/32" using smooth compaction rolls and were then dried for 30 minutes at 220° F. and screened to pass a ¼ screen and remaining on a 10 mesh screen.

The product resembled quite closely, natural dehydrated green bell peppers which are manufactured by California Vegetable Concentrates (Division of General Foods) in appearance, flavor, and bite.

Storage studies over a period of 7 weeks showed no change in appearance or flavor.

This process makes it possible to control size which relates to the physical appearance of different dehydrated vegetables, making this a very important attribute of the process.

The addition of 5% by weight of the product to stews and soups gives good green pepper flavoring.

EXAMPLE 6

Cereal Encapsulation to Make Artificial Horseradish Flavor

The formulation was as follows:
Artificial Horseradish Flavor: 3 lbs.
Potato Starch: 97 lbs.
Water: 33 lbs. (25%)

A Brabender extruder was used at 100 RPM, with a 1:1 transfer screw. The barrel temperature was 140° F. and the die temperature was 185° F. The extension was 4" long flattened to ⅛" at the tip. No outside cooling was required. The pressure at the die was 1,600 psi.

The extruded glassy strips were dried for 60 minutes at 220° F. and then ground to pass a 20 mesh and to remain on a 40 mesh screen. The moisture of the product was 8%.

The product, of this example, was tasted in a triangle test at a level of 500 mg. to 8 oz. of soup against horseradish powder (a product made from natural horseradish) manufactured by California Vegetable Concentrates. Five expert tasters felt the flavors of the two products were comparable.

EXAMPLE 7

Modified Corn Starch as an Encapsulating Agent

Following generally the procedure of Example 1, in accordance with the principles of the invention, oil of sage was encapsulated in a modified corn starch, using a formulation consisting of Modified Corn Starch*: 315 grams
Water: 135 ml. (30%)
Oil of Sage: 12.6 ml. (3.8%)

*Product of National Starch and Chemical Corporation, sld under the trademark "CRISP FILM".

Extruder settings were the same as those in Example 1 except that the pressure at the die was 1200 psi. After drying and sizing, the product was stored at 100° F. and then tested for stability, with the following results:

TABLE VI

| Length of Storage of the Carbohydrate Extrudate Containing Oil of Sage | % Essential Oil Content of Storage at 100° F. |
| --- | --- |
| 0 Days | 3.86 |
| 4 Days | 3.71 |
| 14 Days | 3.82 |

The oil recovery on the extruded product was 96% of the "theoretical".

The unexpanded, glassy carbohydrate products of the invention are dense and physically more defined than explosion puffed proteinaceous products of the prior art. Typical density values, determined by the sand method, as described in U.S. Pat. No. 3,904,769 at column 11 and 12 are set forth in Table VII below. The densities of the products of the invention cover a range of from about 0.9 to about 1.5 g/cc as contrasted with, for example, a density of about 0.5 gram/cc for the expanded product of Katzen U.S. Pat. No. 3,786,123.

TABLE VII

| Product | Density Gm/cc | lbs./cu.ft. |
| --- | --- | --- |
| Corn Starch Glass | 1.28 | 79.9 |
| Potato Starch Glass | 1.39 | 86.7 |
| Waxy Maize Starch Glass | 1.47 | 89.4 |
| Hard Wheat Flour Glass | 1.29 | 80.5 |
| Yellow Corn Flour Glass | 1.30 | 81.1 |
| Green Bell Pepper Flakes (86% Hard Wheat Flour) (14% Additives) | 0.94 | 58.7 |

An important feature of the present invention is the utilization of a minimal quantity of water in the encasement process. This technique is in marked and significant contrast with those prior art procedures commonly known as spray drying. The method of the present invention effects important economies in that the costly evaporation of excessive quantities of water is obviated. It is a practical feature of the invention that its improved method may be applied to effecting the encasement of essential oils and other substances in gums and related materials to provide useful products which, heretofore, have been produced only through the more costly spray drying procedures.

In accordance with the present invention it has been discovered that it is not necessary to put a gum such as gum acacia completely into solution in order to carry out the encapsulation of a flavoring agent or a fixed fat. That is, it has been discovered by adding only about 0.1 pound of water to each pound of gum acacia, along with the flavoring, it is possible to produce, under the extrusion conditions a glass.

The broad versatility of the invention is important in that for certain food or other applications an encapsulating or encasement agent such as gum acacia is to be preferred over starches or cereals. Specifically, the gum encasement matrix is soluble in water and the addition of such products to a water system yields a solution which is clearer than are the solutions obtained upon dissolution of the starch-encased products. The gum encased preparations produced utilizing the process of the invention contains markedly reduced moisture levels as discharged from the reactor, and the nonexpanded gum encased products, which are translucent, can be shaped and dried to provide products exhibiting good encapsulation recoveries and stabilities.

EXAMPLE 8

Gum as an Encapsulating Medium, Using Limited Water

The formulation was as follows:
Gum Acacia: 475 Grams
Water: 47.5 ml. (9%)
Essential Oil (Orange Terpenes): 25 ml. (5%)

The water was dispersed on the gum acacia and the latter chopped into very small pieces followed by the blending in of the essential oil to form a semi-solid mass.

The mass was passed through the Brabender Extruder, Model 100, under conditions as indicated below:

Screw: 1:1 Transfer
RPM: 100
Barrel Temperature: 140° F.
Die Temperature: 194° F.
Extension: 7" Flattened to ⅛"
Extension Cooling: 20 psi The pressure measured at the end of the extruder prior to the extension was 3,000 psi. The product extruded in the form of a clear translucent glass with essentially no expansion. On cooling, the glass became quite brittle and the glass strips were dried for 1 hour in an air oven at 140° F.

The essential oil content of the mix on a dry basis was 5.8%. The dried glass strips ground to pass a 20 mesh screen had an essential oil content of 4.5% indicating a 77% recovery. In this example only 10% of water was required based on the weight of the gum acacia blend, a markedly lower moisture level than required in conventional spray-drying encapsulation.

EXAMPLE 9

Encapsulation of Beef Extract

Beef extract is a very viscous, difficult to use paste. By utilizing the techniques of the subject invention, it is possible to convert 33% of beef extract into a freeflowing, easy to use particulate product. 200 grams of beef extract (85% solids) and 400 grams of Capsul brand dextrin were mixed and extruded through a Brabender extruder at a barrel temperature of 194° F. and a die temperature of 300° F. with a 1:1 transfer screw. An extension to the Brabender was cooled to obviate expansion of the extruded product. The extrudate was discharged as a soft smooth strip which hardened on cooling. The product was ground through a Cometrol using a 0.240 cutter and then dried for 2½ hours at 140° F. Ground to pass a 40 mesh screen the end product was free flowing and most useful in blending operations.

The concentrate was found completely suitable for incorporation in many food preparations, concentrations in the range of up to 10% or 15% being employed in particular applications.

The products of the invention and the methods of producing the same are typified by, additional specific examples set forth below, provided for illustration only, and not in any limiting sense.

Oil of sage was used to prepare a series of compositions in which the oil was encased as a microdispersion in a proteinaceous glass produced as an essentially unpuffed extrudate.

In Example 10, a solvent-extracted soy flour, having an NSI of 70% and a protein content of 52% on a dry weight basis, was used. Soy flour was also used in the microencapsulation of sage oil at a higher level, in Example 11. In Example 12, soy protein concentrate was utilized as the protein base, and in Example 13, casein was used.

The proteins were added to a mixer such as a Hobart Model A-200, and, with agitation, the water was added with the addition of the oil of sage to develop a friable mass which could then be fed to the extruder.

The mixtures were extruded through a Brabender pilot plant extruder, the barrel of which was heated to a temperature of about 80° to 90° C., the barrel being fitted with a die adapter which was heated to about 170° C. At the exit of the Brabender an extension was fitted, approximating 8 inches in length, which which was flattened at the end to an opening of approximately ⅛ inch. Suitable air cooling could be applied to the extension. The extrudate left the Brabender in translucent unexpanded sheets and the final product had a density greater than water.

The strips of extrudate were cut to approximately ¼ inch lengths and the vitreous "glass" was then dried in an oven at 100° C. for 1 hour followed by grinding in a Fitz Mill to the desired mesh.

The dried, ground products were steam distilled to determine the essential oil content to provide a measure of the conversion of essential oil after extrusion, drying, and grinding. A portion of the final product was placed in open dishes for 4 weeks at room temperature to determine the "stability" of the products. Perfect stability would mean no loss in essential oil on storage.

The results of these tests are shown in TABLE VIII:

TABLE VIII

| Microencapsulation of Oil of Sage | | | | |
|---|---|---|---|---|
| | 10 | 11 | 12 | 13 |
| Soy Flour (lbs.) | 10 | 10 | — | — |
| Soy Protein Concentrate (lbs.) | — | — | 10 | — |
| Casein (lbs.) | — | — | — | 10 |
| Water (lbs.) | 4 | 4 | 4 | 3.7 |
| Water in the Mix (%) | 28 | 28 | 28 | 28 |
| 50% Sodium Hydroxide (ozs.) | — | — | — | 3.2 |
| Oil of Sage (gms.) | 90 | 185 | 185 | 204 |
| | (2%) | (4%) | (4%) | (4½%) |
| Stability After 4 weeks Storage at Room Temperature (%) | 90 | 90 | 95 | 95 |

The level of oil of sage used ranged from 2 to 4.3% in the blends and the encapsulation was excellent demonstrating that with as little as one part of water to 2.5 parts of protein a suitable microdispersion can be formed which gives excellent conversion and stability, equivalent, if not better, to what can be obtained by conventional emulsification where the level of water exceeds substantially, the quantity of protein.

In Example 14, 4 pounds of water was blended with 10 pounds of soy flour and 235 grams of oil of nutmeg (5%) was added. There was excellent conversion and stability.

In Example 15, 4 pounds of water was added to 10 pounds of soy flour along with 185 grams of oil of sage (4%). After extrusion and drying, the product was ground into fractions as follows:
(a) Through a 5 and on a 20 U.S. Standard Screen.
(b) Through a 20 and on a 60 U.S. Standard Screen.

TABLE IX

| | Extraction of Oil of Sage from Extrudate, by Use of Carbon Tetrachloride | | | |
|---|---|---|---|---|
| | Fraction Through 5-Mesh Screen and on 20-Mesh Screen | | Fraction Through 20-Mesh Screen and on 60-Mesh Screen | |
| Solubility Procedure | Mg. of Oil of Sage Extracted per Gram of Extrudate* | Percent of Oil of Sage Extracted | Mg. of Oil of Sage Extracted per Gram of Extrudate** | Percent of Oil of Sage Extracted |
| A | 0 Mg. | 0% | 0 Mg. | 0% |
| B | 7 Mg. | 32% | 10 Mg. | 50% |
| C | 19.5 Mg. | 83% | 21 Mg. | 105% |

*Orig. concentration of oil of sage = 23.4 mg./gram of extrudate
**Original concentration of oil of sage = 20 mg./gram of extrudate With the high shear developed forming the protein glass, the oil of sage is microdispersed to particle sizes in the range of from several microns to ½ micron or less. As a result, the finished product may be coarsely ground or ground fine with excellent conversion and retention of the oil in excess of 90% of theoretical. The fractions, when stored at 100° F. for even 16 weeks, showed remarkable stability indicating that the enveloping protein film or matrix provides excellent protection. The oil of sage locked in the protein matrix is "unavailable" for solvent extraction. This can be demonstrated by the following experiments:

(1) In Test A, the ground material was added directly to the carbon tetrachloride and the extent of solubility was determined by an ultraviolet photometric procedure.

(2) In Test B, the two fractions were dispersed in water for a period of 1 hour and the slurry was then extracted with carbon tetrachloride.

(3) In Test C, the two fractions were dispersed in water and the product was then added to a Waring Blender where the high shear of the blades broke down the particles to a fine suspension. This product was then extracted with carbon tetrachloride.

The results are shown in Table IX. It can be seen that the stability of the two ground products is excellent as evidenced by a zero extraction with carbon tetrachloride in the dry state (Test A). Even after substantial time allowed for hydration, the bulk of the oil of sage was still locked in the protein matrix (Test B). Only after complete disintegration using a Waring Blender, was it possible to recover the oil of sage in carbon tetrachloride (Test C).

The data establish that an essential oil, normally soluble in carbon tetrachloride, is protectively encased in a protein matrix in accordance with the practice of the present invention, it being necessary either mechanically to disrupt the protective coating or to solubilize it before the oil is releasable.

In addition tests the extrusion molten glass procedure was used for the purpose of enrobing Vitamin C and ferrous sulfate. Vitamin C can readily be oxidized on exposure to air or in the presence of moisture and is especially labile under heat processing conditions. The iron present in ferrous sulfate has excellent nutritional qualities but the ferrous ion acts as a pro-oxidant. There was interest in learning whether the enrobing of the ferrous sulfate in a protein matrix would encase the ferrous sulfate and make it unavailable as a pro-oxidant in food systems. The product compositions are given in TABLE X.

TABLE X

| ENROBING OF VITAMIN C AND FERROUS SULFATE | | |
|---|---|---|
| | 16 | 17 |
| Casein (lbs.) | 1.6 | 1.6 |
| Water (lbs.) | 0.45 | 0.45 |
| Water (%) | 21 | 21 |
| Vitamin C (Gms.) | 80 | — |
| Vitamin C in the Mix (%) | 10 | — |
| Ferrous Sulfate (Gms.) | — | 80 |
| Ferrous Sulfate in the Mix (%) | — | 10 |

The two products were extruded using the pilot plant extruder and the glass strips were cut to a length of ¼ inch and dried at 160° F. followed by grinding with the Fitz Mill through a 20 mesh screen. The slow release of Vitamin C obtained through the microdispersion in the protein melt can be demonstrated through solubility tests. When 1 gram of the mechanical mix corresponding to the composition of Example 16, but not extruded, was added to 100 ml. of water containing 15% by weight of sodium chloride, it was found that the entire theoretical amount of Vitamin C originally present dissolved in the aqueous phase in less than 1 minute. The results obtained on using the extruded product of Example 16, are shown in TABLE XI.

TABLE XI

| SOLUBILITY OF MICRODISPERSED VITAMIN C | |
|---|---|
| Length of Stirring of 1 Gram of Extrudate per 100 ml. of Salt Solution | % of the Vitamin C Extracted |
| 1 Minute | 24.8 |
| 2 Minutes | 30.9 |
| 4 Minutes | 41.2 |
| 7 Minutes | 53.4 |
| 10 Minutes | 64.6 |
| 15 Minutes | 75.2 |
| 20 Minutes | 83.5 |

Only 24.8% of the Vitamin C is rendered soluble after 1 minute of extraction, showing the effect of the protective proteinaceous matrix which slows down the release of the Vitamin C. After 4 minutes of agitation more than half of the Vitamin C is still locked in the protein matrix.

Experiments carried out with the product of Example 17 provide still further proof of the effectiveness of the encasement or enrobing technique of the invention as a means to protect or otherwise to isolate an encased material in a proteinaceous matrix. The material used in this study was ground extrudate consisting of 10% by weight of ferrous sulfate enrobed in casein.

The tests described are based upon the fact that metals such as ferrous iron greatly accelerate peroxide formation in fats. In order to evaluate the pro-oxidant effect of iron present, five gms. of lard, containing no antioxidant, was melted and blended uniformly with 85 gms. of wheat flour, and 10 gms. of the extrudate was then blended in. The sample (Sample 1), thus prepared, was compared with two control samples prepared as follows:

In the first control sample (Sample 2), 5 gms. of the same lard product was melted and blended uniformly with 85 gms. of the same wheat flour product. One gram of ferrous sulfate and 9 gms. of casein were uniformly blended with the lard and the wheat flour to form a control sample.

In the second control sample (Sample 3), 5 gms. of lard was melted and blended uniformly with 85 gms. of wheat flour. This was blended with 10 gms. of casein to provide a control sample containing no ferrous sulfate.

One batch of each of the three blends was filled to a depth of about ½ inch in each of separate, open 5-inch by 7-inch aluminum trays, and the trays stored for periods of 4, 6, 10, and 26 days in an incubator at 100° F. At each of the indicated time intervals, a 25 gm. sample of each blend was extracted with chloroform and the peroxide value of the extracted fat determined (A.O.A.C. 28.022, 12th Edition, 1975; meq. peroxide/kg. oil or fat). The peroxide values found are shown in TABLE XII. The samples were also examined for odor as an indication of the development of rancidity in the fat. The results of these olfactory tests are recorded in TABLE XII.

It was found that the control blend of ferrous sulfate (Sample 2) had already developed a rancid note after only 6 days of storage, the odor becoming more evident after 10 days of storage and being very marked after 26 days of storage. The ground extrudate glass (Sample 1) showed only a low level of peroxide formation after 10 days of storage and the sample still had a good odor and showed no evidence of rancidity after 26 days.

In a second series of runs, a portion of each of the same three blends was sealed in each of separate pint jars and the jars stored in an incubator at 100° F. After 4 days, the control blend, without ferrous sulfate (Sample 3), had a peroxide value of 3.4. The same peroxide value was obtained for the blend made with the extrudate (Sample 1). The control blend, which contained ferrous sulfate (Sample 2) had a peroxide value of 18.8 after 10 days storage and had a marked rancid odor.

The above data establish conclusively that the extrudate concentrate prepared in accordance with the practice of the invention possesses enhanced stability characteristics. The pieces were dried for 1 hour at 100° F. and the product then ground to pass a U.S. 40 mesh screen. The product, when added to water, is not wetted and remains essentially in a protected non-hydrated form indefinitely. In use, it was found that during processing of the breakfast cereal to which the encapsulated minerals had been added, the matrix of water-insoluble vital wheat gluten protectively encased the mineral elements.

TABLE XIII

| | PEROXIDE VALUE OF EXTRACTED FAT | | |
|---|---|---|---|
| Length of Storage at 100° F. | (1) Blend Having Protein-aceous Extrudate with Ferrous Sulfate Therein | (2) Control Blend with Ferrous Sulfate | (3) Control Blend Without Ferrous Sulfate |
| 4 Days | 3.4 | 13.7 | 3.4 |
| 6 Days | 3.3 | 14.2 | 0 |
| 10 Days | 5.2 | 18.8 | 0 |
| 26 Days | Sweet Odor | Very Rancid | Sweet Odor |

TABLE XIII-continued
PEROXIDE VALUE OF EXTRACTED FAT

| Length of Storage at 100° F. | (1) Blend Having Protein-aceous Extrudate with Ferrous Sulfate Therein | (2) Control Blend with Ferrous Sulfate | (3) Control Blend Without Ferrous Sulfate |
|---|---|---|---|
| Odor | | | |

EXAMPLE 18
Encapsulation of Minerals

The food industry has long sought an effective way of encapsulating iron and other minerals for use in cereals which are subject to processing. The problem has been that any protective coatings used have either dissolved or have otherwise been rendered ineffective by the processing step. As a result, the cereal itself is subject to premature rancidity. The present invention solves the problem by providing an encapsulating medium which withstands the stresses of processing. The example described below shows the importance of "special" encapsulating materials for specific uses, in accordance with the present invention. In order to supply 25% of the RDA of iron and zinc, a premix was prepared in the ratio of 153 grams of zinc oxide and 147 grams of reduced iron.

The following materials were combined in the concentrations indicated.
Mineral mix, consisting of reduced iron and zinc salts: 17.5 lbs. 27.5%
Zinc Stearate: 10 lbs.
Wheat Gluten (vital): 72.5 lbs.
Water: 14.5 lbs. (17%)

The zinc stearate serves as an additional "waterproofing" agent.

A blend of the above was extruded through a laboratory Brabender extruder using a die temperature of 356° F. and a barrel temperature of 194° F. with a maximum speed and with a 1:3 compression screw. A ⅝" stainless steel tube 8" long and flattened to give an opening of ⅛" was attached to the end of the extrusion die and cooling air at approximately 40 psi was directed onto the extension. The product extruded as a dense unexpanded glassy strip which was ground in a Comitrol through a 0.06 cutter.

The following is an example of how the extrusion process may be used to make an onion flavor concentrate with seven times the strength of onion powder.

EXAMPLE 19
NU-SPICE ® ONION 7X

The formula used was as follows:
Soy Flour (defatted): 10 lbs.
Water: 1800 ml. (28%)
Oil of Onion: 1 oz. (0.6%)

The product extruded, using the pilot plant Brabender, as a good translucent glass. The extrudate was cut into lengths of ¼ inch and was dried for 45 minutes at 200° F. and then ground in the Fitz Mill to pass a 40-mesh screen.

Flavor evaluations demonstrated that this product had sevenfold the flavor of good quality ground onion powder. Storage tests over a lengthy period showed no loss of flavor. Extended shelf studies in casserole dishes showed that the protein matrix film protected the aroma and flavor of the onion to yield excellent spice concentrates. The onion concentrate may be used at a level of ⅛ to ½ oz. per 100 pounds of food product.

The following examples demonstrate the utility of the extrusion encasement process of the invention for preparing spice products that simulate their natural counterparts in size and shape. But in contrast to the natural spice, the volatile flavor is protected from loss, by the protein matrix.

EXAMPLE 20
NU-SPICE ® COARSE OREGANO

The formulation was as follows:
Soy Flour (defatted): 10 lbs.
Water: 1800 ml. (28%)
Oil of Oregano: 215 ml. (4%)
Color The blend was extruded in the Brabender using a barrel temperature of 90° C. and a die temperature of 150° C. A 1:3 transfer screw was used and the RPM was maximum. The extension at the end of the extruder was 10 inches long flattened to a ⅛ inch opening. 25 pounds of air pressure was used on the extension for cooling. The extrudate was cut to ¼ inch lengths and dried for 45 minutes at 200° F. and was then cracked in a Fitz Mill.

In order to produce the appearance of a coarse oregano one must modify the color systems to have both a green component and a brown component and then blend these two products. The mesh of the finished product for a coarse oregano was as follows:
On a 10: Zero
On a 20: 64%
Through a 30: 6%

The essential oil content of the finished cracked product was 3.9% showing excellent recovery and the product was stored for 8 days at 100° F. to check on stability. The essential oil content was 4.05%, showing no loss. In similar tests made with natural spice (ground oregano), at least 50% of the essential oil was lost in 8 days' storage at 100° F. Also, in ground oregano, which is a typical herb, serious problems are always involved in freeing the herb of insect fragments and other contaminants.

The product "NU-SPICE" Oregano, for practical purposes, looks like oregano and has the virtues of cleanliness, freedom from bacteria, stability of flavor, and other advantages. It may be used at a range of ½ to about 4 ozs. per 100 pounds of food.

EXAMPLE 21
NU-SPICE ® FENNEL SEED

Problems involved with fennel seed, in relation to its use in foods, probably are more involved than any of the other spices. The shape and size of a fennel seed is comparable to that many natural contaminants, making it difficult to clean the spice.

A fennel seed was prepared as follows:
Soy Flour (defatted): 10 lbs.
Water: 1800 ml. (28%)
Oil of Fennel: 172 ml. (3.6 pts. to 100 lbs.) (3.8%)
Color The blend was extruded using the Brabender but in this case the die extension was fitted with six transverse stainless steel wires which sliced the extruded product to a thickness of ⅛ inch. The extrudate was dried for 15 minutes at 200° F. and was then cut into 150 inch lengths.

The finished product had the color of fennel seed, had very much the shape and appearance of fennel seed, and the flavor was good.

The conversion recovery of essential oil was 86% and the stability was excellent.

EXAMPLE 22

NU-SPICE ® BLACK PEPPER

The formula was as follows:
Soy Flour (defatted): 10 lbs.
Water: 1800 ml. (28%)
Oleoresin Black Pepper: 270 gms. (5%)
Oleoresin Capsicum: 28.5 gms. (0.6%)

The blend was extruded using the Brabender and cut to ¼ inch lengths and dried in the oven for 35 minutes at 200° F. The product was ground with a Raymond Mill to pass through a 40-mesh screen and 30% went through an 80-mesh screen. The product was tasted against the natural spice and found to be comparable to the natural spice both in flavor and pungency. Use ½ to about 4 ozs. per 100 pounds of food.

EXAMPLE 23

NU-SPICE ® BLACK PEPPER CONCENTRATE

A "Nu-Spice" Black Pepper product was prepared with threefold the flavor strength of conventional soluble black peppers. The formulation used was as follows:
Soy Flour (defatted): 84 lbs.
Oleoresin Black Pepper: 16 lbs. (16%; 3% essential oil)
Water: 33.6 lbs. (28%)

The blend was extruded and the glass extrudate was cut into ¼ inch pieces and dried for 35 minutes at 200° F. The product was then ground in the laboratory Raymond Mill to pass a 40-mesh screen. The finished product, on flavor evaluation, was found to have at least three times the black pepper flavor strength of a soluble seasoning.

If one were to blend 16 pounds of oleoresin black pepper with salt or sugar, the normal vehicles used for soluble seasonings, a thick viscous paste would result. This material would not be commercially acceptable. By utilizing the extrusion encasement process of the present invention a product is obtained which is very free flowing. The process is simplicity itself and makes it possible to produce concentrates which offer many advantages over soluble seasonings, including reduced freight costs, lesser demands for storage space, and with the further advantage of flavor stability even at very high concentrational levels.

What is claimed is:

1. An encapuslated product in the form of spice concentrates and simulated spices,
   comprising from about one-half to about forty percent by weight of an agent selected from the group consisting of essential oils, oleoresins, and mixtures thereof,
   said agent being dispersed throughout and encased within but recoverable from an enveloping matrix comprising a fused encapsulating material selected from the group consisting of starches, cereal flour, modified starches, gums, proteins, and mixtures thereof,
   said agent being distributed throughout said encapsulating material as a micro dispersion of from about five microns to submicron in size, and
   said encapsulated product having a density in the range of from about fifty-five to about ninety pounds per cubic foot;
   said encapsulated product containing said micro dispersion being the product obtained by blending said encapsulating material, said agent, and from about ten to about forty percent by weight of water based on the total weight of encapsulating material and water to provide a friable blend, subjecting said blend through extrusion to pressure and to heat to form a glasseous melt, and extruding said melt under non-puffing conditions,
   the resulting said product constituting a substantially homogeneous, dense, essentially unexpanded, translucent-to-glassy extrudate,
   each said encapsulated product exhibiting excellent stability on long-term storage, and being suitable for adding to foods as a flavoring therefor.

2. The product as set forth in claim 1 wherein said product is in a particulate form and comprises particles of a size to pass through a 5-mesh and to be retained on a 100 mesh U.S. standard screen.

3. The product as set forth in claim 1 wherein said product is in particulate form and comprises particles of a size to pass through a 100-mesh and to be retained on a 200-mesh U.S. standard screen.

4. The product as set forth in claim 2 wherein said product is of a size, shape and thickness to simulate the visual appearance of a natural spice product.

5. The method of flavoring a food product, said method comprising the steps of
   preparing a storage-stable, dense, glassy concentrate of an agent selected from the group consisting of essential oils, oleoresins, and mixtures thereof,
   said agent being dispersed throughout and encased within but recoverable from an enveloping matrix comprising a fused encapsulating material selected from the group consisting of starches, cereal flour, modified starches, gums, proteins, and mixtures thereof,
   said concentrate comprising from about ½ to about 20% by weight of said agent distributed as a micro-dispersion throughout said encapsulating material,
   said concentrate containing said micro-dispersion being prepared by blending said encapsulating material, said agent and from about 10 to about 40% by weight of water based on the total weight of encapsulating material and water, to provide a friable blend, subjecting said blend through extrusion to pressure and to heat to form a glasseous melt, and extruding said melt under non-puffing conditions,
   thereby to yield a substantially homogeneous, dense, essentially unexpanded, translucent-to-glassy extrudate having a density in the range of from about 55 to about 90 pounds per cubic foot,
   said agent being distributed substantially uniformly throughout said extrudate as a dispersed phase of micro particles of from about 5 microns to submicron in size in an enveloping matrix of said encapsulating material to provide a concentrate of said agent in which said agent is stable against loss and deterioration, and
   incorporating said concentrate in a food product to impart flavor thereto.

* * * * *